United States Patent [19]

Kanemura

[11] Patent Number: 4,707,649
[45] Date of Patent: Nov. 17, 1987

[54] MOTOR CONTROLLING SYSTEM

[75] Inventor: Shoji Kanemura, Kawasaki, Japan

[73] Assignee: Canon Kabushiki Kaisha, Tokyo, Japan

[21] Appl. No.: 712,780

[22] Filed: Mar. 18, 1985

[30] Foreign Application Priority Data

Mar. 26, 1984 [JP] Japan ................................. 59-56222

[51] Int. Cl.⁴ ............................................ G05B 19/40
[52] U.S. Cl. .................................. 318/685; 318/696; 400/903
[58] Field of Search ................ 318/685, 696; 400/322, 400/903

[56]  References Cited

U.S. PATENT DOCUMENTS 4,471,282 9/1984 Moriguchi ........................... 318/696
4,490,664 12/1984 Moriguchi ........................... 318/696
4,602,882 7/1986 Akazawa ............................. 400/322

Primary Examiner—William M. Shoop, Jr.
Assistant Examiner—Saul M. Bergmann
Attorney, Agent, or Firm—Fitzpatrick, Cella, Harper & Scinto

[57]  ABSTRACT

A motor controlling system in which a stepping motor can be always stopped at a constant or predetermined position. During initialization an excitation phase is stored after the motor has been detected to have passed a particular position. During actual operation, after the motor has been detected to have passed that particular position, the excitation phase of the motor is monitored and compared with the stored excitation phase. The motor is stopped upon coincidence of the compared excitation phases.

19 Claims, 4 Drawing Figures

4,707,649

MOTOR CONTROLLING SYSTEM

BACKGROUND OF THE INVENTION

Field of the Invention

The present invention relates to a motor controlling system in which positioning of a stepping motor can be performed.

Further in detail, the present invention controls a stepping motor, which is used to drive, for example, a carriage of an electronic typewriter, to be always to be set at a predetermined rotational position.

Description of the Prior Art

Hitherto, in known motor controlling systems when a stepping motor is to be set at a certain particular position (for instance, in case of an electronic typewriter, when the carriage is moved to the home position), there has been adopted a method whereby after the stepping motor passes through the particular position, it is rotated by only a constant or predetermined number of steps and is stopped, or the motor is stopped at a constant or predetermined excitation phase. In the former case, an error of ±1 step maybe caused because of lack of mechanical precision in detecting passage through the particular position. On the other hand, in the latter case, such an error is not caused because the motor is stopped at the predetermined phase after detection of passage through the particular position and a certain imprecision in such detection can therefore be tolerated. However, it is necessary to adjust the detecting mechanism, such as a home position sensor, for detecting passage of the motor through the particular position to be certain that the mechanism is not positioned at the boundary of the predetermined excitation phase.

SUMMARY OF THE INVENTION

In consideration of the foregoing point, it is an object of the present invention to provide a motor controlling system in which a stepping motor can be always stopped at a constant or predetermined position.

To accomplish the above object, the present invention comprises detecting means for transmitting a detection signal representing that a moving member which is driven in response to the rotation of the stepping motor reaches a particular position; storage means for preliminarily storing, as reference position information, an excitation phase which is obtained by rotating the stepping motor by only N steps after transmission of the detection signal; and means for comparing the excitation phase of the stepping motor with the excitation phase preliminarily stored in the storage means after the detection signal is transmitted in case of positioning the stepping motor.

Another object of the invention is to provide a motor controlling system having an arrangement such that, after a signal is detected, the motor is driven by a predetermined amount and the state of the motor at that time can be stored.

Still another object of the invention is to provide a stepping motor control apparatus having an arrangement such that, after a signal is detected, excitations commensurate with a predetermined number of steps are performed and the excitation phase of the stepping motor at that time can be stored.

Still another object of the invention is to provide a position control apparatus for a moving apparatus for moving a member.

Still another object of the invention is to provide a motor controlling method whereby, after a signal is detected, the motor is driven by a predetermined amount and the state of the motor after this driving is stored.

Still another object of the invention is to provide a controlling system for a stepping motor in which, after a signal was detected, the motor is driven by a predetermined number of steps and thereafter the motor is driven again until a phase preliminarily stored in storage means coincides with a present excitation phase.

DETAILED DESCRIPTION OF PREFERRED EMBODIMENT

One embodiment of the present invention will now be described in detail hereinbelow.

Figure 1:
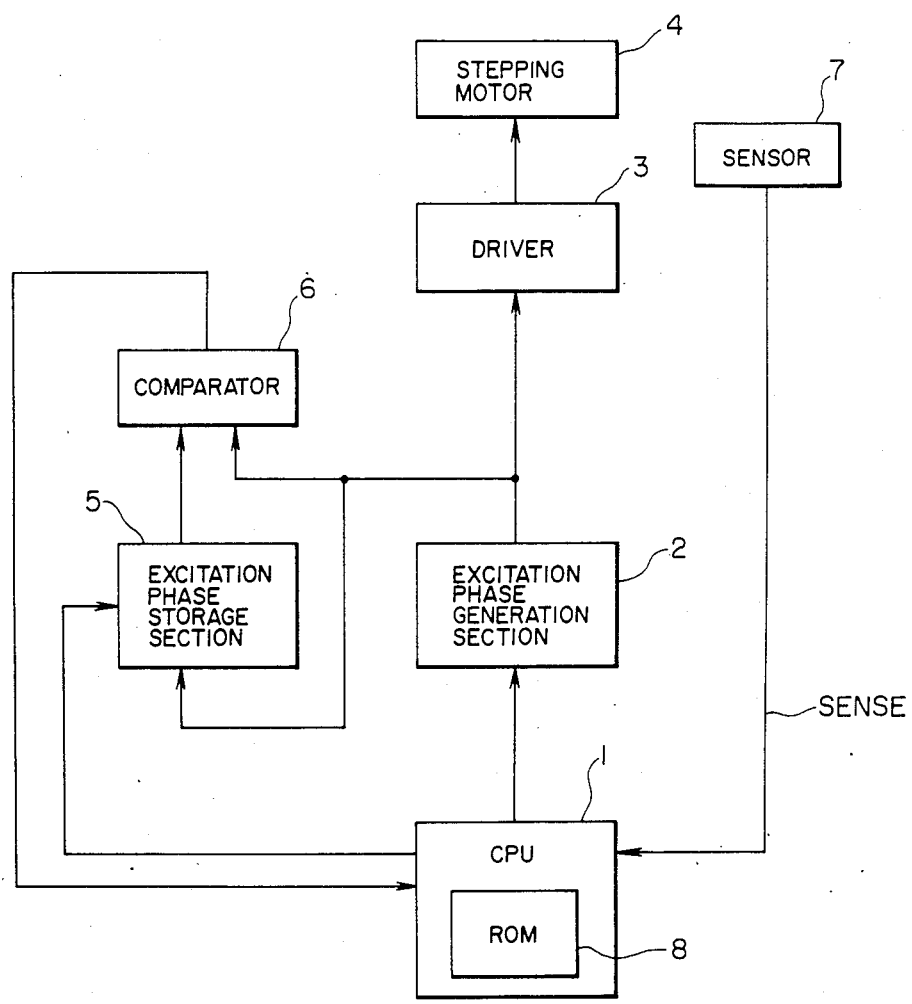
FIG. 1 is a block diagram showing one embodiment to which the present invention is applied.

FIG. 1 is a block diagram showing one embodiment of the invention. A reference numeral 1 denotes a CPU to perform logic operation, judgment, etc. This CPU controls the driving of a stepping motor 4. An excitation phase generation section 2 generates, at a given time, a set of "on" and "off" pulses to the respective phases of the stepping motor 4. Such a set of "on" and "off" pulses (forming a digital word) is herein referred to as an "excitation phase." A driver 3 drives the stepping motor 4.

An excitation phase storage section 5 stores the excitation phase generated by the generation section 2, in response to a command from the CPU 1 as explained below. A comparator 6 compares the phase which is outputted by the excitation phase generation section 2 with the phase stored in the excitation phase storage section 5 and transmits the result of a comparison to the CPU 1.

Figure 2:
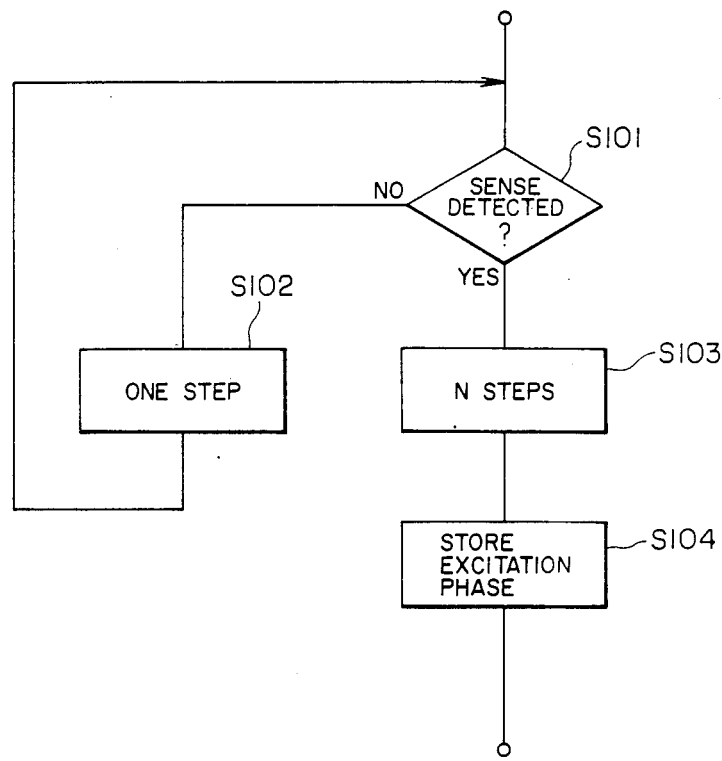
FIGS. 2 and 3 are flowcharts showing the control procedure of the embodiment.
Figure 3:
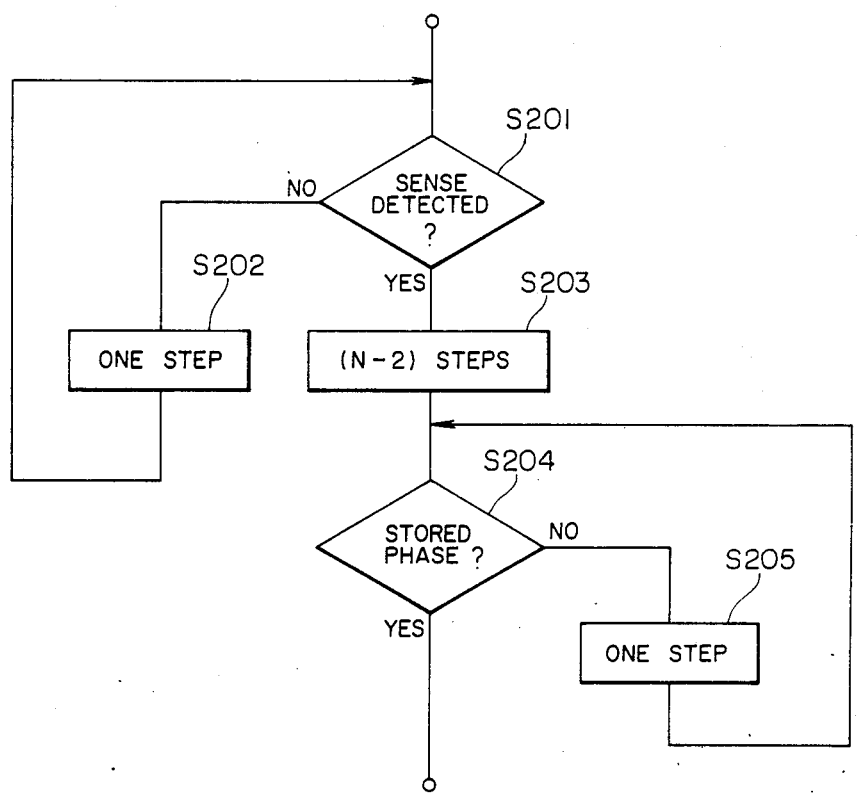

A position sensor 7 transmits a detection signal SENSE to the CPU 1 when a moving member (not shown) which is driven by the stepping motor 4 passes through a predetermined home position. As an example of the foregoing moving member, a carriage of an electronic typewriter can be mentioned. A numeral 8 indicates a storage device ROM in the CPU 1. Control programs in accordance with flowcharts shown in FIGS. 2 and 3 are stored in this ROM 8.

The control procedure of the embodiment will then be described in detail with reference to the flowcharts.

In this embodiment, the four-phase unipolar stepping motor is driven in accordance with II (two) phase excitation. The operation upon initial operation or "rising" or initialization of the system according to the invention will be first explained. FIG. 2 shows the flowchart for explaining the operation to be controlled by the CPU 1 at that time. The driving of the stepping motor 4 is started from one excitation phase and in step S101, a check is made to see if the detection signal SENSE shown in FIG. 1 is produced or not. In the case where the signal SENSE is not detected yet, the stepping motor 4 is rotated by only a particular step in step S102. On the contrary, when the detection signal SENSE is detected in step S101, step S103 follows and the motor is rotated by only a necessary number of steps N. In step S104, the excitation output at that time is stored in the excitation phase storage section 5.

Due to the foregoing operation, the positioning of the motor at the rising time initial operation of this system is performed.

Next, the case where the positioning is again performed after the initial operation of the system will be described. FIG. 3 is the flowchart showing the control procedure in this case.

Steps S201 and S202, from the starting at the particular excitation phase until the detection signal SENSE is produced, are similar to the foregoing operation at the rising time or initial operation. When the detection signal SENSE is produced in step S201, step S203 follows and the stepping motor 4 is rotated by only (N−2) steps. Subsequently, the content of the output of the comparator 6 is checked in step S204 to see if the current excitation phase conincides with the excitation phase stored previously or not. Unless they are the same excitation phase, the control routine advances to step S205 and the stepping motor 4 is further rotated by only one step. Returning to step S204, the output of the comparator 6 is again checked. When the same excitation phase as the excitation phase stored is derived as determined by the output of the comparator 6, the control loop ends and the positioning is finished.

In the above description, it is preferable that a value of the integer "N", shown in steps S103 and S203, generally be set to the number which is about one-half of the number of steps in which the excitation phase is repeated to complete one cycle of an excitation sequence in consideration of the mechanical accuracy of locating the sensor 7. For instance, in case of using a four-phase motor, it is desirable to set N to a value of about four in case of adopting the I-II phase exciting method.

On the other hand, even in case of eliminating step S203, it is apparent that this embodiment operates normally.

Figure 4:
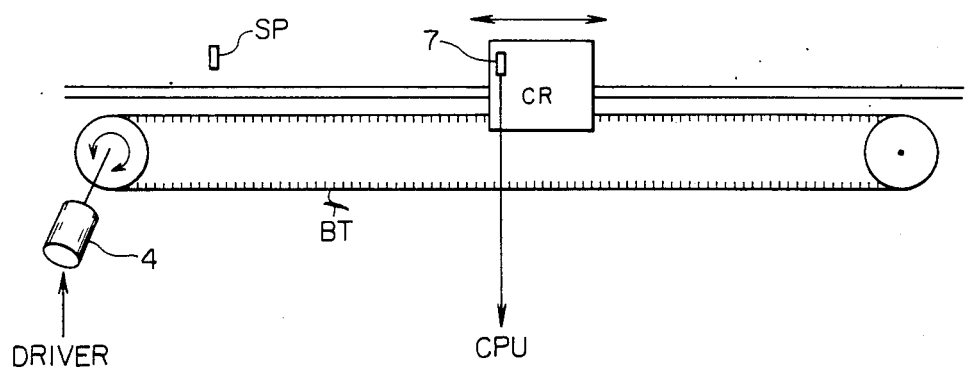
FIG. 4 is a schematic external view of the embodiment of the invention.

FIG. 4 shows an external view for explaining carriage control in the environment of an electronic typewriter. SP denotes a sensing point which consists of a magnet or LED or the like. The sensor 7 detects the magnetic flux, light or the like of the sensing point SP. CR represents a carriage which is moved through a belt BT by the rotation of the stepping motor 4.

As described above, according to the present invention, when the positioning is performed using the position sensor, the excitation phase at which a stepping motor, excited during initial operation, is stopped, is preliminarily stored. Therefore, the same stop position of the motor as that upon initial operation can thereafter be set accurately. Further, there is no need to perform a mechanical adjustment of the location where the position sensor is placed or the like.

What is claimed is:

1. A motor controlling system for controlling movement of a motor, said system comprising:
   means for detecting a signal;
   control means for allowing said motor to be driven by a predetermined amount of movement after the signal is detected by said detecting means; and
   means for storing, as a reference position for movement of said motor, an indication of the position of said motor within a cycle of an excitation sequence of said motor after said motor is allowed to be driven by the predetermined amount of movement by said control means.

2. A motor controlling system according to claim 1, wherein said motor is a stepping motor.

3. A motor controlling system according to claim 2, wherein the predetermined amount of movement is a number of steps of said stepping motor.

4. A motor controlling system according to claim 1, wherein said means for storing an indication of the position of said motor stores an excitation phase.

5. A motor controlling system according to claim 2, wherein said means for storing an indication of the position of said motor stores an excitation phase.

6. A motor controlling system according to claim 3, wherein said means for storing an indication of the position of said motor stores an excitation phase.

7. A motor controlling system according to claim 3, wherein the number of steps is a number approximately one-half of the number of excitations of phases of said stepping motor through which said stepping motor is repeatedly excited to complete one cycle of an excitation sequence of said stepping motor.

8. A stepping motor control apparatus for controlling movement of a stepping motor, said apparatus comprising:
   means for detecting a signal;
   control means for allowing said stepping motor to be excited through a predetermined number of excitation phases as steps after the signal is detected by said detecting means;
   means for storing, as a reference position of said stepping motor, the excitation phase in accordance with which said stepping motor is excited after said stepping motor is excited through the predetermined number of excitation phases by said control means; and
   means for comparing the one excitation phase, stored in said means for storing an excitation phase, with the excitation phase in accordance with which the stepping motor is currently being excited.

9. A stepping motor control apparatus according to claim 8, further comprising second control means for stopping the excitation of the stepping motor when a coincidence is derived by said comparing means.

10. A stepping motor control apparatus according to claim 8, further comprising a driver to excite the stepping motor.

11. A stepping motor control apparatus according to claim 8, wherein the predetermined number is a number approximately one-half of the number of excitations of phases of said stepping motor through which said stepping motor is repeatedly excited to complete one cycle of an excitation sequence of said stepping motor.

12. A position control apparatus for use in a moving apparatus to move a member, comprising:
   means for detecting a signal representing that the member has been moved to a predetermined position due to the moving operation of the moving apparatus;
   control means for allowing the member to be moved by a predetermined amount of movement by the moving apparatus after the signal is detected by said detecting means;
   means for storing, as a reference position for movement of the moving apparatus, an indication of the position of the moving apparatus within a cycle of an excitation sequence of said moving apparatus when the member is allowed to be moved by the predetermined amount of movement by said control means; and means for comparing the indication stored in said storing means with the current position of said moving apparatus.

13. A position control apparatus according to claim 12, wherein said member is a carriage of a printer.

14. A position control apparatus according to claim 12, wherein the moving apparatus is a stepping motor.

15. A position control apparatus according to claim 14, wherein the predetermined amount of movement is a number of steps of movement of said moving apparatus.

16. A position control apparatus according to claim 12, further comprising second control means for stopping the moving apparatus when coincidence between the indication stored in said storing means and the current position of said moving apparatus is derived by said comparing means.

17. A motor controlling method comprising:
a first step of detecting a signal;
a second step of driving a motor by a predetermined amount of movement after the signal is detected in said first step; and
a third step of storing, as a reference position for movement of the motor, an indication of the position of the motor within a cycle of an excitation sequence of said motor after execution of said second step.

18. A motor controlling method according to claim 17, further comprising:

a fourth step of driving the motor by an amount of movement less than the predetermined amount of movement after the signal is detected;
a fifth step of comparing the indication of the position of the motor stored in said third step with the current position of the motor; and
a sixth step of driving the motor until a coincidence between the stored indication of the position of the motor and the current position of the motor is derived in said fifth step.

19. A controlling system for a stepping motor, in which is stored, as a reference position, the excitation phase in which the stepping motor is driven after a predetermined number of driving steps after a detection of a signal, said system comprising:
means for detecting the signal;
control means for allowing the stepping motor to be driven by approximately the same number of driving steps as the predetermined number of driving steps after the signal is detected by said detecting means;
means for comparing the stored excitation phase with the current excitation phase after the stepping motor is driven by said control means by approximately the same number of driving steps as the predetermined number of driving steps; and
second control means for allowing the stepping motor to be driven until coincidence between the stored excitation phase and the current excitation phase is derived by said comparing means.

* * * * *

UNITED STATES PATENT AND TRADEMARK OFFICE
CERTIFICATE OF CORRECTION

PATENT NO. : 4,707,649
DATED : November 17, 1987
INVENTOR(S) : SHOJI KANEMURA

It is certified that error appears in the above-identified patent and that said Letters Patent is hereby corrected as shown below:

COLUMN 1

Line 11, delete "to be" (first occurrence).
    Line 14, "systems" should read --systems,--.
    Line 23, "maybe" should read --may be--.

COLUMN 2

Line 8, "was" should read --is--.
    Line 41, delete "a".

COLUMN 3

Line 4, "time initial" should read --time or initial--.
    Line 18, "conincides" should read --coincides--.

Signed and Sealed this

Nineteenth Day of July, 1988

Attest:

DONALD J. QUIGG

Attesting Officer     Commissioner of Patents and Trademarks